United States Patent [19]

Kurosawa et al.

[11] 4,152,190
[45] May 1, 1979

[54] THERMAL FUSION SPLICERS FOR OPTICAL FIBERS

[75] Inventors: Noboru Kurosawa, Hachioji; Naoshige Sasano, Sagamihara, both of Japan

[73] Assignee: Showa Electric Wire & Cable Co. Ltd., Kawasaki, Japan

[21] Appl. No.: 852,876

[22] Filed: Nov. 18, 1977

[30] Foreign Application Priority Data

Nov. 22, 1976 [JP] Japan .................................. 51-139547

[51] Int. Cl.² ........................ B29C 27/04; B65H 69/06
[52] U.S. Cl. .................................... 156/366; 156/158; 156/304; 156/379; 156/380; 156/499; 156/502; 156/507; 269/8; 269/37
[58] Field of Search ............... 156/158, 304, 359, 366, 156/379, 380, 499, 502, 503, 507, 544, 583, 157, 538; 269/37, 165, 196, 8

[56] References Cited

U.S. PATENT DOCUMENTS

| | | | |
|---|---|---|---|
| 1,956,840 | 5/1934 | Walmsley | 269/8 |
| 2,384,014 | 9/1945 | Cutter | 156/366 |
| 2,591,519 | 4/1952 | Decker | 156/379 |
| 3,226,218 | 12/1965 | Belknap | 269/37 |
| 3,346,942 | 10/1967 | Modrey | 269/8 |
| 3,798,099 | 3/1974 | Marcatili | 156/502 X |
| 3,919,037 | 11/1975 | Miller | 156/296 X |

*Primary Examiner*—Michael G. Wityshyn
*Attorney, Agent, or Firm*—Fred Philpitt

[57] ABSTRACT

The splicer comprises a stationary block provided with a first V shaped groove for accommodating opposing ends of optical fibers, and an opening perpendicular to the groove. On the opposite sides of the stationary block there are provided a pair of slidable blocks provided with second grooves in alignment with the first groove and clamping means for clamping the fibers. The slidable blocks are moved toward and away from the stationary block by micrometers. A heater is provided in the opening for heating and fusing together the opposing ends of the optical fibers.

8 Claims, 6 Drawing Figures

THERMAL FUSION SPLICERS FOR OPTICAL FIBERS

BACKGROUND OF THE INVENTION

This invention relates to a thermal fusion splicer for optical fibers.

The splice loss of optical fibers is determined by the misalignment of two optical fibers which are spliced by thermal fusion. It has already been proposed a thermal fusion splicer for optical fibers where the relative position of two blocks for clamping opposing ends of two optical fibers to be spliced are precisely adjusted by a micromotion mechanism capable of moving in the vertical, horizontal and fore and aft directions, and the opposing ends are fused together by heating them by an electric heater, for example, while observing the ends by a microscope in two directions in two planes respectively intersection with the fibers at right angles. With this device, however, it requires much time to adjust the abutting positions of the fibers, precise micromotion mechanism and a microscope having a high magnifying power so that such device is not suitable to use in field works.

SUMMARY OF THE INVENTION

Accordingly, it is an object of this invention to provide an improved thermal fusion splicer for optical fibers having small size, light weight and compact construction and is suitable for splicing optical fibers of compound glass on silica glass.

Another object of this invention is to provide a novel thermal fusion splicer for optical fibers capable of readily adjusting the positions of the fibers by merely adjusting the spacing between fiber ends.

Still another object of this invention is to provide an improved thermal fusion splicer for optical fibers including a mechanism that can ensure sufficiently high abutting accuracy necessary for the thermal fusion operation with a simple setting operation.

According to this invention there is provided a thermal fusion splicer for optical fibers comprising a stationary block provided with a first V shaped groove in its upper surface and an opening perpendicular to the upper surface and intersecting with the groove, a pair of slidable blocks mounted on the opposite sides of the stationary block and provided with second V shaped grooves in alignement with the first V shaped groove, means mounted on the slidable block for clamping optical fibers to be fused together to the walls of the second V shaped grooves, means for moving the slidable blocks toward and away from the stationary block, and heating means located near the opening for heating the opposing ends of the optical fibers.

DESCRIPTION OF THE PREFERRED EMBODIMENTS

Figure 1:
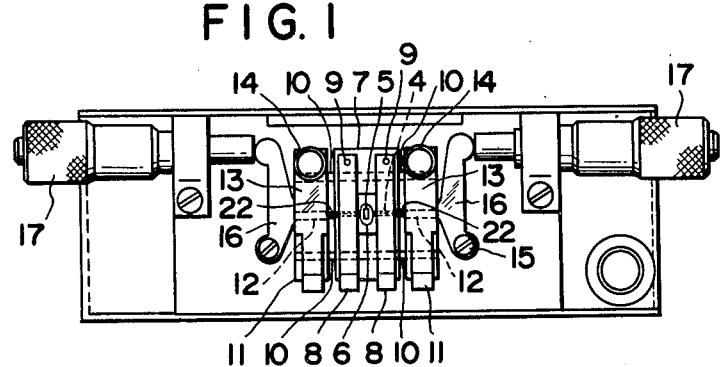
FIG. 1 is a plan view showing one embodiment of the thermal fusion splicer of this invention.
Figure 2:
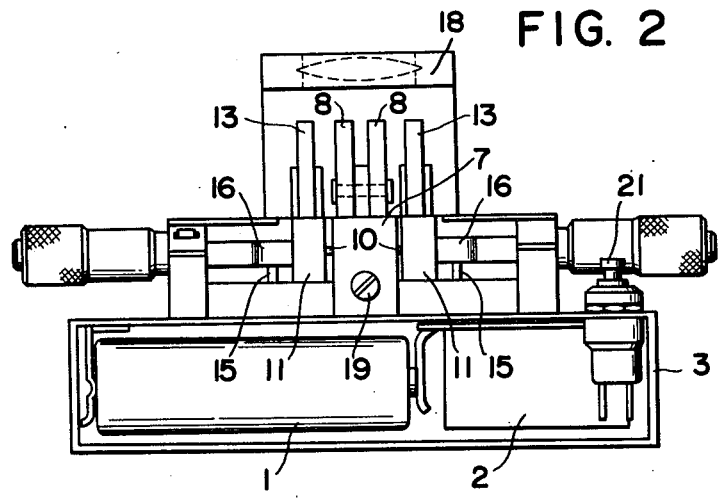
FIG. 2 is a front view of the splicer shown in FIG. 1.
Figure 3:
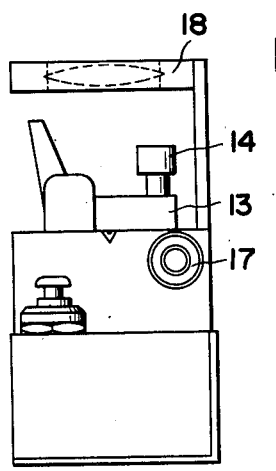
FIG. 3 is a side view of the splicer.
Figure 4A:
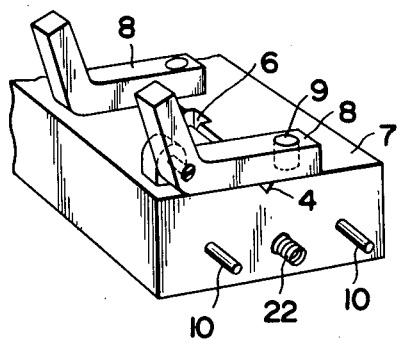
FIG. 4A is a perspective view showing a stationary block.
Figure 4B:
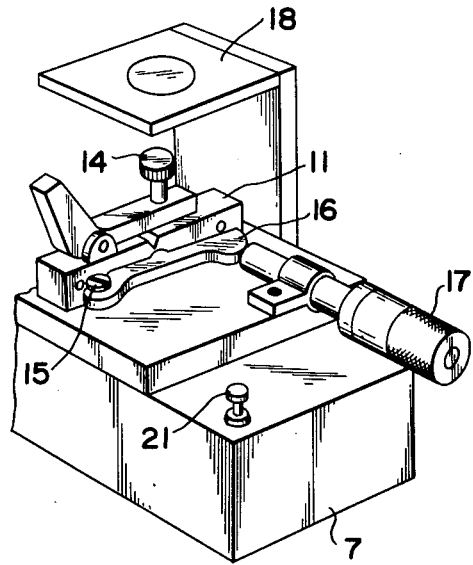
FIG. 4B is a perspective view showing a modified stationary block.
Figure 5:
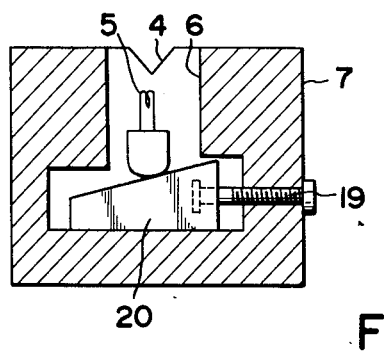
FIG. 5 is a cross-sectional view of the stationary block shown in FIG. 1.

A preferred embodiment of the thermal fusion splicer of this invention comprises a base 3 containing a battery 1 and a control device 2 which includes a timer, not shown. At the central portion of the upper surface of the base 3 is secured a stationary block 7 having a V shaped groove 4 extending in parallel with the longitudinal axis of the base 3, and the block 7 is provided with an opening 6 for accommodating an electric heater 5 at the longitudinal center of groove 4. The groove V has a dimension corresponding to the diameter of the optical fibers, and the optical fibers placed in the groove are clamped by levers 8 at the opposite ends of the block. Each clamping lever 8 takes the form of a letter L and is pivotally mounted on one side of the block by a pivot shaft which is parallel to the groove 4. A permanent magnet 9 is mounted near the free end of the clamping lever 8.

A pair of slidable blocks 11 are provided on both sides of the stationary block 7 to slide along a pair of guide members 10 which project from the opposite sides of block 7 in a direction parallel with V shaped groove 4. On the upper surfaces of the slidable blocks 11 there are formed V shaped grooves 12 aligned with groove 4 and having a dimension corresponding to the diameter of the optical fibers. Furthermore, clamp levers 13 are secured to the upper surfaces of respective slidable blocks 11, and each clamp lever 13 is provided with a set screw 14.

Intermediate portions of micromotion levers 16 supported by shafts 15 perpendicular to the upper surface of the base engage slidable blocks 11 and the free ends of the micromotion levers 16 abut against the heads of micrometers 17 respectively.

A foldable magnifying lens 18 is secured to the central portion of one side of the base 3. A heater height adjusting screw 19 is provided for the block 7, the screw extending therethrough at right angles with respect to the V shaped groove 4. The heater 5 is mounted on a wedge shaped support 20 moved by the adjusting screw 19.

There are also provided a push button switch 21 for energizing the heater and for starting the timer, and springs 22 are interposed between slide blocks 11 and block 7.

The optical fibers are spliced in the following manner. At first, the exposed ends of optical fibers to be connected together are placed in groove 4 of block 7 and then clamped by clamp levers 8. After clamping the fibers to slidable blocks 11, micrometers 17 are rotated to move slidable blocks 11 through levers 16 until the ends of the optical fibers abut with each other just above the heater. This condition can be observed through the magnifying lens 18. At this time, switch 21 is closed to energize the heater for a time determined by the timer thereby completing the fusion.

With the apparatus described above, since the fibers are positively clamped by permanent magnets 9 and levers 8, they are always applied with a definite pressure so that even when the fibers are adjusted in the longitudinal direction by moving the slidable blocks, the fibers would not be displaced in the lateral direction. Moreover, as the adjustment of micrometers 17 are transmited to the slidable blocks through levers at a reduced rate it is possible to provide fine adjustment. It is also possible to establish an optimum heating condition because voltage and time for energizing the heater can be set to any desired values by the control device contained in the base 3. Furthermore, according to this invention, since it is possible to abut the opposing ends of optical fibers by merely adjusting the fibers in the longitudinal direction failure of connection can be decreased. Moreover as it is necessary to adjust the optical fibers in only one direction, that is in the longitudinal direction, it is possible to miniaturize the apparatus.

Figure 6:
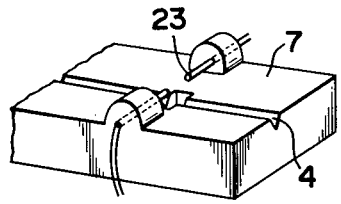
FIG. 6 is a partial perspective view showing a modified heating device in the form of discharge electrodes.

It was found that the time necessary for fusion is about 30 seconds when two small capacity dry cells are used.

Where high melting point glass fibers such as silica fibers are to be fused, a pair of discharge electrodes 23 are disposed on the upper surface of block 7 at right angles with respect to V shaped groove 4, as shown in FIG. 6 so as to heat and fuse the glass fibers by the heat of electric discharge.

Although in the foregoing description, for the sake of description it was assumed that each optical fiber consists of a bare single fibers, actually each fiber is covered with a sheath and the sheath is removed before thermal fusion splicing.

What we claim is:

1. A thermal fusion splicer for optical fibers comprising a stationary block provided with a first V shaped groove on its upper surface and an opening perpendicular to said upper surface and intersecting with said groove, a pair of slidable blocks mounted on the opposite sides of said stationary block and provided with second V shaped grooves in alignment with said first V shaped groove, means mounted on said slidable blocks for clamping optical fibers to be fused together to the walls of said second V shaped grooves, means for moving said slidable blocks toward and away from said stationary block, and heating means located near said opening for heating through said opening the opposing ends of said optical fibers.

2. The thermal fusion splicer according to claim 1 wherein said heating means is located in said opening and said thermal fusion splicer further comprises means for moving said heating means in the axial direction of said opening.

3. The thermal fusion splicer according to claim 1 wherein said heating means comprises an electric heating element connected to a timer for controlling the time of energization thereof.

4. The thermal fusion splicer according to claim 1 wherein said heating means comprises a pair of discharge electrodes disposed on the opposite sides of said opening and said first groove.

5. The thermal fusion splicer according to claim 1 wherein said stationary block comprises a pair of clamping members each provided with a permanent magnet.

6. The thermal fusion splicer according to claim 1 wherein said stationary and slidable blocks are mounted on the same base with springs interposed between said stationary block and each said slidable block, and wherein said means for moving said slidable blocks comprises a pair of micrometers for moving said slidable blocks toward and away from said stationary block through levers.

7. The thermal fusion splicer according to claim 1 wherein each of said levers is pivotally mounted on a base at one end, the other end is engaged by said micrometer and an intermediate point thereof is urged against a said slidable block.

8. The thermal fusion splicer according to claim 1 which further comprises a magnifying lens immediately above said opening.

* * * * *